United States Patent Office 3,595,950
Patented July 27, 1971

3,595,950
PRECURE COATING FOR RUBBERY POLYMERS
Stanley M. Mezynski, Akron, Ohio, assignor to The Goodyear Tire & Rubber Company, Akron, Ohio
Filed May 29, 1967, Ser. No. 642,177
Int. Cl. B29h 21/04; B44d 1/24
U.S. Cl. 264—130                                     10 Claims

ABSTRACT OF THE DISCLOSURE

Precure coatings for unvulcanized polymers such as those found in the sidewall areas of pneumatic tires, the coatings comprising a polymeric portion of ethylene propylene terpolymers alone or in combination with other polymeric materials to retard surface defect formation and to prevent the polymer from adhering to the mold after vulcanization.

---

This invention relates to a precure coating to be applied to the surface of unvulcanized polymers, cements for said coating and a process for effectively releasing a vulcanized polymer from a vulcanization mold wherein the formation of surface defects in the polymer during the vulcanization step is retarded.

Polymers, particularly rubbery polymers, have a tendency to adhere to vulcanization mold surfaces after vulcanization occurs. Therefore, prior to vulcanization, rubbery stocks are often coated with a polymeric coating which is compatible with the rubbery polymer and which also does not adhere to the mold surface, thereby facilitating easy removal of the rubbery product from the mold after vulcanization. These coatings are generally identified as mold releasing agents or precure paints or coatings. The type of precure coating is normally applied to the unvulcanized rubbery product in the form of a black loaded cement containing vulcanization ingredients. A preferred precure coating is one which will not remain, even in part, on the surface of the mold when the rubbery product is released from the mold after vulcanization. Such mold buildup of the precure coating is undesirable since it requires periodic cleaning of the mold. An ideal precure coating should allow the portion of the rubbery product in proximity to the surface of the mold to flow without restriction and without the formation of surface defects such as cracks, air bubbles or voids in the surface of the rubber during the vulcanization step so as to form a smooth surface. It is also desirable that the precure coating itself form a smooth coating on the rubbery product. This provides the product with a presentable appearance and also helps to prevent subsequent cracking of the rubbery product due to oxygen and/or ozone attack. An irregular surface has been found to promote these types of attack.

Various coatings have been used in the past other than the polymeric type. These include soapstone and silicone. Soapstone, although possessing normally adequate mold release properties, has serious disadvantages in that the powdery state of the material causes it to be a health hazard, makes it difficult to handle, causes contamination of adjacent areas and also requires cleanup of surrounding areas. In addition, it leaves deposits in the mold, thereby requiring periodic cleaning of the mold. It also does little to prevent the formation of surface defects on the surface of the molded material during the vulcanization step. Silicone may be used to coat the mold or the surface of the unvulcanized product. The use of silicone is an improvement over the use of soapstone in that the mold release properties are improved. However, the use of silicone can still result in the formation of serious surface defects. SBR precure coating has been used and possesses adequate mold release properties. In addition, mold buildup is much less of a problem than when soapstone or silicone are used. Although its use reduces surface defects, such defects still occur to a greater degree than is normally desired. In addition, the use of an SBR precure coating results in serious cracking. Butadiene-styrene copolymers (SBR) have been used as the polymeric portion of commercial precure coatings for some time. It has been discovered that an SBR coating when used in this manner is detrimental to the crack resistance of rubbery products to which it is applied when these rubbery products themselves are subject to oxygen and/or ozone attack subsequent to the vulcanization step. A rubbery product containing no such coating is more resistant to attack than one coated with an SBR coating. Therefore, a need has arisen for a precure coating which will offer adequate mold releasing properties, result in a minimum of mold buildup, have reasonable resistance to ozone and oxygen attack and, most importantly, retard the formation of surface defects during the vulcanization step.

It is an object of this invention to provide a precure coating which may be applied to the surface of unvulcanized polymers so as to help prevent the formation of surface defects during the vulcanization of the rubbery polymers and to allow the rubbery product to be easily released from the mold after the vulcanization step. Other objects will appear as the description proceeds.

The objects of this invention are accomplished by coating unvulcanized polymer with a vulcanizable coating composition comprising (A) a polymeric portion which comprises (1) 10 to 100 parts of at least one ethylene propylene terpolymer (EPDM) and (2) 0 to 90 parts of at least one polymeric material and (B) a vulcanization system, the parts of (1) and (2) being by weight per 100 parts of said polymeric portion.

Preferably the vulcanizable coating composition contains black normally in the range of 100 to 1000 parts by weight of carbon black or a like material to facilitate porosity in the coating and thereby further helps to prevent the formation of surface defects. A preferred range is 200 to 350 parts.

Various nonconjugated dienes can be used to prepare the rubbery terpolymers of ethylene, propylene and a diene EPDM. Representative examples of the nonconjugated dienes are aliphatic dienes having from 6 to 22 carbon atoms such as 1,4-hexadiene, 1,5-heptadiene, 1,6-octadiene, 6-methyl-1,5-heptadiene, 7-methyl-1,6-octadiene, 11-ethyl-1, 11-tridecadiene, 9-ethyl-1,9-undecadiene, 7-ethyl 1,7-nonadiene, 8-propyl-1,8-undecadiene, 8-ethyl-1,8-decadiene, 10-ethyl-1,9-dodecadiene, 12-ethyl-1,12-tetradecadiene, 13-n-butyl-1,12-tridecadiene and 15-ethyl-1,-15-heptadecadiene, and cycloaliphatic dienes and substituted cycloaliphatic dienes such as dicyclopentadiene and 5-alkenyl-substituted-2-norbornenes such as 5-methylene-2-norbornene, 5-ethylidene-2-norbornene, and 2-alkyl-2,5-norbornadienes such as 2-methyl-2,5-norbornadiene. The generally preferred nonconjugated dienes are 1,4-hexadiene, dicyclopentadiene, 5-methylene-2-norbornene and 5-ethylidene-2-norbornene. Usually such terpolymers contain from about 20 to about 80 weight percent units derived from propylene and from about 1 to about 15 weight percent units derived from the diene.

The polymeric materials that may be employed in blends with EPDM within the practice of the present invention to form the polymeric portion of the coating composition are natural rubber and the synthetic polymers and copolymers prepared from conjugated dienes as well as the synthetic polymers and copolymers prepared from mono olefins. Representative examples of the synthetic polymers used in the practice of this invention are polychloroprene; homopolymers of a conjugated 1,3-diene such as isoprene and butadiene; and in particular, polyisoprenes and polybutadienes having essentially all of their segmeric units combined in a cis-1,4 structure; copolymers of a conjugated 1,3-diene such as isoprene and butadiene with up to 50 percent by weight of at least one copolymerizable monomer such as styrene and acrylonitrile; butyl rubber, which is a polymerization product of a major proportion of a mono olefin and a minor proportion of a multi olefin such as butadiene or isoprene; and polymers and copolymers of mono olefins containing little or no unsaturation, such as polyethylene, polypropylene and ethylene propylene copolymers.

The practice of this invention is found particularly beneficial when the EPDM is blended with homopolymers of a conjugated 1,3-diene such as isoprene and butadiene and copolymers of said diene with up to 50 percent by weight of at least one copolymerizable monomer such as styrene and acrylonitrile. The practice of this invention is found most beneficial when the EPDM is blended with rubbery copolymers of butadiene and styrene.

The unvulcanized polymers that may be coated prior to vulcanization are identical to those which may be used in combination with the EPDM to form the polymeric portion of the coating composition. Blends of the polymers may be coated. In addition, the unvulcanized polymers to be coated may contain EPDM. The use of the term "unvulcanized polymer" is intended to include unvulcanized polymer containing carbon black, vulcanization agents, antioxidants and any other compounding ingredients used in such polymers. The practice of this invention is found particularly beneficial where the unvulcanized polymers contain conventional tire compounds such as natural rubber; homopolymers of a conjugated 1,3-diene such as isoprene and butadiene, and in particular, polyisoprenes and polybutadienes having essentially all of their segmeric units combined in a cis-1,4 structure; and copolymers of a conjugated 1,3-diene such as butadiene and isoprene with up to 50 percent by weight of at least one copolymerizable monomer such as styrene and acrylonitrile.

Although the ratio of EPDM to the polymeric material in the coating compositions may range from 10/90 to 100/0 of EPDM to the polymeric material a preferred range is from 20/80 to 75/25 of EPDM to the polymeric material. A most desirable range is from 30/70 to 50/50.

By the phrase "vulcanization system" is meant any system conventionally used to cross-link polymers such as peroxide or sulfur-type vulcanization systems. By sulfur-type vulcanization system is meant the combination of elemental sulfur and at least one accelerator, which may or may not contain sulfur released in the course of vulcanization, but in any case activates the elemental sulfur before or during its combination with the rubber molecules to effect cross-linking of the rubbery molecules with one or more atoms of sulfur. Representative is a system comprising sulfur and at least one sulfonamide. Naturally the vulcanization system may be varied to obtain optimum results depending on the composition of the particular EPDM blend used.

The coating of the rubbery product with the precure coating is normally accomplished by applying the precure coating in the form of a cement although the method of coating is not necessarily critical. Inert organic solvents are normally used to prepare the cement. Normally suitable solvents include gasoline, toluene and benzene. Naturally the selection of the best solvent can depend on the polymeric material blended with the EPDM. The cement may be applied to the unvulcanized rubbery polymer by any of the conventional methods of applying a liquid to a solid surface, such as by spraying or brushing it on the unvulcanized rubbery polymer. The cement may be prepared by any of the conventional means of making organic solvent cements, such as ball mill mixing.

Various tests were run to determine the properties of the mold releasing agents of the present invention.

Kinetic and static ozone tests were run on coated polymers. The static tests were run as follows: Samples 6 x 1.0 x 0.075 inch were cut from a vulcanized sheet. Prior to vulcanization the sheet was dipped into the appropriate mold releasing cement, withdrawn and allowed to dry. The ends of the samples were placed in metal holders and extended to a length of 112.5 percent of their original length. They were then surrounded by an atmosphere possessing an ozone concentration of 50 parts per hundred million by volume at a temperature of 100° F. for a period of 48 hours. The kinetic ozone tests were carried out on 6 x ½ x 0.075 inch test samples also cut from a cured sheet. The ends of these samples were also placed in metal holders and intermittently extended to 111 percent of their original length at a frequency of 33 cycles per minute. They were placed in an atmosphere possessing an ozone concentration of 50 parts per hundred million by volume at a temperature of 100° F. for a period of 48 hours. Both the static and dynamic ozone samples were then visually evaluated for crack formation and rated according to the rating system disclosed by J. C. Ambelang and B. W. Habeck in "Rubber World" 141, 86 (1959). Such tests indicate the effect of weathering on the coated polymers.

Static and kinetic sun check data was gathered as another method of determining the effect of weathering on the coated polymers. Both the static and kinetic sun checking tests were carried out on samples 6 inches in length and 0.075 inch thick. The samples had a V taper width of 1.1 inches at one end and 0.5 inch at the other. The wide end possessed two holes while the narrow end possessed one hole. The holes allowed the sample to be fastened to the appropriate testing apparatus.

The static sun checking samples were secured on a wooden frame at an extended length of 115 percent of their original length. These extended samples were then weathered outdoors until cracking occurred.

The ends of the kinetic sun checking samples were placed in metal holders and intermittently extended 115 percent of their original length at a frequency of 60 cycles per minute. This assembly was also weathered outdoors until cracking occurred.

After the weather testing was completed both the static and kinetic sun checking samples were visually evaluated for crack formation and rated according to the rating system disclosed by J. C. Ambelang and B. W. Habeck in "Rubber World" 141, 86 (1959).

Adhesion tests were made to determine mold releasing properties of the coatings. The 4 x 4 inch test samples for the adhesion tests were cut from uncured stock sheeted out at about 0.100 inch gauge and fabric reinforced. The two samples were coated with the appropriate precure paint and placed in contact with one another with a piece of Holland cloth being inserted part way (about one inch) from the side of the sample to prevent adhesion from occurring at this portion of the interface. The samples were then placed in a vulcanization press under a pressure of 550 p.s.i. minimum and vulcanized at a temperature of 300° F. A one inch wide sample was then cut from the 4 x 4 x ¼ inch block and placed in the test chamber at the desired test temperature, which was ordinarily 200° F. The nonadhering ends were placed in the clamps of a Scott tester and the clamps separated at the rate of two inches per minute. The force in pounds required to separate the two compounds was taken as a measurement of the degree of adhesion between the compounds.

The following examples include illustrations of the practice of the present invention but are not intended to so limit the scope of the present invention.

EXAMPLE 1

The following discloses the preparation of a cement as used in the practice of the present invention. A nonproductive compound of the following composition was mixed for six minutes in a 50 r.p.m. 00 Banbury mixer:

| Components: | Grams |
|---|---|
| SBR 1006 [1] | 70.0 |
| EPDM [2] | 30.0 |
| Medium processing oil | 2.0 |
| Stearic acid | 2.5 |
| Antioxidant | 2.0 |
| Talc | 65.0 |
| Zinc stearate | 45.0 |
| Furnace black | 20.0 |

[1] A hot butadiene-styrene copolymer containing approximately 23.5% bound styrene, by weight.
[2] The EPDM contains by weight approximately 54.5% ethylene, 43.5% propylene and 2.0% 1,4-hexadiene.

The above compound was then mill mixed with 3.0 grams of zinc oxide, 1.75 grams of sulfur and 2.5 grams of 2-(morpholinodithio)-benzothiazole. Following the milling 114.9 grams of the mill mixed product, 118.9 grams of carbon black and 2852 milliliters of gasoline were placed in a one gallon can containing a quart of mixing stones. The can was capped, placed on rollers and rotated four days at 48 r.p.m. after which time the solids were completely dispersed in the gasoline.

EXAMPLE 2

The sidewalls, shoulders and ribs of several million production passenger tires were sprayed with a black loaded SBR precure cement over a period of six months. Surface defects such as discoloration and light spots on the surface of the tires were noted. When these defects reached an arbitrary level the tire was determined to be defective. During a nine month period immediately following the six month period the SBR was replaced with a black loaded cement of a 30/70 EPDM/SBR blend compounded similarly to the formulation in Example 1. The number of tires determined to be defective due to discoloration and light spots was decreased by 27 percent through the use of the EPDM/SBR blend cement.

EXAMPLES 3 AND 4

Since it has been discovered that SBR precure coating can sometimes decrease the weathering resistance of the coated polymers, the static and kinetic ozone and sun check properties of a tire compound coated with SBR were compared with the same properties of a tire compound coated with an EPDM/SBR blend. The tire compound was a black loaded composition the rubbery portion of which comprised an EPDM/SBR/natural rubber blend. Example 3 is based on the tire compound coated with the SBR. Example 4 is based on the tire compound coated with the EPDM/SBR blend. The data are listed in Table I. The EPDM/SBR cement was prepared according to Example 1. The SBR cement was prepared as follows:

A nonproductive compound of the following composition was mixed for six minutes in a 50 r.p.m. 00 Banbury mixer.

| Components: | Grams |
|---|---|
| SBR 1006 | 100.0 |
| Medium processing oil | 2.0 |
| Stearic acid | 2.5 |
| Antioxidant | 1.0 |
| Furnace black | 22.5 |
| Talc | 66.2 |
| Zinc stearate | 47.0 |

The above compound was then mill mixed with 3.00 grams of sulfur and 1.50 grams of mercaptobenzothiazole. Following the milling 114.9 grams of the mill mixed product, 238.4 grams of carbon black and 2852 milliliters of gasoline were placed in a one gallon can containing a quart of mixing stones. The can was capped, placed on rollers and rotated four days at 48 r.p.m. after which time the solids were completely dispersed in the gasoline.

TABLE I

| Example | 3 | 4 |
|---|---|---|
| Coating | SBR | EPDM/SBR |
| Static ozone: | | |
| Original | [1] 0/0 | 0/0 |
| Aged | 1/0.5 | 0/0 |
| Kinetic ozone: | | |
| Original | 0/0 | 0/0 |
| Aged | 3/0.5-1 | 0.5/0.5 |
| Static sun check—Aged | 4/0.5 | 0/0 |
| Kinetic sun check—Original | 3/0.5-1 | 0.5/0.5 |

[1] These data are based on the visual crack formation rating system disclosed by J. C. Ambelang and B. W. Habeck in "Rubber World" 141, 86 (1959). The numerator value is a rating given the test samples based on the *density* of cracks formed during the ozone testing. As the number of cracks increase the numerator value increases. The denominator value is a rating based on the *size* of the cracks. This value increases as the crack size increases. A rating of 4/10 is the poorest rating under this rating system, while a rating of 0/0 is the best possible rating.

The above data indicate that the EPDM/SBR blend coated tire compound (Example 4) weathered to a lesser degree than the SBR coated compound.

EXAMPLES 5–10

Adhesion tests were run as earlier described herein on coated tire compounds. A comparison of the data was made to determine to what extent the coatings would prevent the adherence of the rubbery strips to one another. The ability of the coatings to prevent adherence of the rubber to itself is an indication that the coatings will also prevent the adhesion of the rubber to a mold surface. The tire compounds are identified as A and B in Table II. The composition of compound B was identical to that of the tire compound used in Examples 3 and 4. Compound A was a black loaded composition, the rubbery portion of which consisted essentially of SBR, natural rubber and cis-1,4 polybutadiene.

Examples 6 and 9 are based on rubbery samples A and B respectively coated with an SBR cement of the type described under Example 3.

Examples 7 and 10 are based on rubbery samples A and B respectively coated with an EPDM blend of the type described in Example 1. Examples 5 and 8 are based on rubbery samples A and B respectively and possess no coating.

TABLE II

| Example | 5 | 6 | 7 | 8 | 9 | 10 |
|---|---|---|---|---|---|---|
| Coating | None | SBR | EPDM/SBR | None | SBR | EPDM/SBR |
| Rubbery sample | A | A | A | B | B | B |
| Adhesion (lbs.) | 180½ | 20½ | 4 | 150 | 14 | 5¼ |

The above data indicate that both the SBR (Examples 6 and 9) and EPDM/SBR blend (Examples 7 and 10) act as mold releasing agents. The data also indicate that the blend within the practice of the present invention (Examples 7 and 10) is superior to the SBR mold releasing agent (Examples 6 and 9) in this respect.

EXAMPLES 11–15

A tire compound of the type described under Examples 3 and 4 was coated with cements prepared according to Example 1 but containing various levels of EPDM in the rubbery portion of the cement. Example 11 used an SBR cement of the type described in Example 3. Examples 12, 13, 14 and 15 used the EPDM/SBR cements.

Aged and unaged static and kinetic ozone tests were run on the coated samples in a manner as described earlier herein. The data are listed in Table III.

TABLE III

| Example | 11 | 12 | 13 | 14 | 15 |
|---|---|---|---|---|---|
| Coating composition: | | | | | |
| SBR | 100 | 70 | 60 | 50 | 25 |
| EPDM | | 30 | 40 | 50 | 75 |
| Static ozone: | | | | | |
| Original | 4/1–4 | 3/1–3 | 4/0.5 | 3/0.5 | 1/0.5 |
| Aged | 3/0.5–3 | 2/0.5–1 | 1/0.5 | 0/0 | 0/0 |
| Kinetic ozone: | | | | | |
| Original | 4/1–4 | 4/1–4 | 4/0.5–1 | 4/0.5 | 2/1–4 |
| Aged | 4/2–5 | 2/0.5 | 0/0 | 0/0 | 0/0 |

The above data indicate that as the amount of EPDM in the SBR/EPDM blend was increased the weathering resistance increased. This not only confirms the fact that EPDM is resistant to weathering but indicates that the level of EPDM does not impair the ability of the SBR/EPDM blend to retard the formation of surface defects during the vulcanization step. As described earlier herein, the formation of surface defects during the vulcanization step tends to promote oxygen and/or ozone attack of the coated material.

EXAMPLES 16 AND 17

Compound A as described in Examples 5–10 was coated with an SBR cement (Example 16) and an SBR/EPDM cement (Example 17) of the types described in Examples 3 and 4 respectively. Aged and unaged kinetic ozone tests were run on the coated compounds. The data are listed in Table IV.

TABLE IV

| Example | 16 | 17 |
|---|---|---|
| Coating composition: | | |
| SBR | 100 | 70 |
| EPDM | | 30 |
| Kinetic ozone: | | |
| Original | 0/0 | 0/0 |
| Aged | 3/1–4 | 0/0 |

The unaged test samples showed no signs of cracking whether coated with the SBR or SBR/EPDM blend. The aged sample coated with SBR cracked substantially after being subjected to the kinetic ozone test, while the SBR/EPDM coated compound developed no cracks.

The above data and the data in Examples 3 and 4 indicate that the coatings of the present invention offer protection to a variety of rubbery polymers or rubbery polymer blends.

Examples 18–22

Blends of an SBR block polymer (Solprene 1205), SBR 1006 and EPDM were used to form cements of the type described in Example 1. The cements were used to coat tire compounds A and B described in Examples 5–10. The aged and unaged coated compounds were subjected to static ozone testing. The data are listed in Table V.

TABLE V

| Example | 18 | | 19 | | 20 | | 21 | | 22 | |
|---|---|---|---|---|---|---|---|---|---|---|
| Coating composition: | | | | | | | | | | |
| SBR | 70 | | 60 | | 45 | | 20 | | | |
| SBR block polymer | | | 10 | | 25 | | 50 | | 70 | |
| EPDM | 30 | | 30 | | 30 | | 30 | | 30 | |
| | A | B | A | B | A | B | A | B | A | B |
| Static ozone: | | | | | | | | | | |
| Original | 0/0 | 0/0 | 0/0 | 0/0 | 0/0 | 0/0 | 0/0 | 0/0 | 0/0 | 0/0 |
| Aged | 0/0 | 0/0 | 0/0 | 0/0 | 0/0 | 0/0 | 0/0 | 0/0 | 0/0 | 0/0 |

As the data indicate, none of the samples cracked during testing. These data demonstrate that polymers other than conventional SBR polymers may be used in combination with EPDM without sacrificing weathering resistance. These data also indicate that the use of other polymers does not impair the ability of the SBR/EPDM blend to retard the formation of surface defects during the vulcanization step. As described earlier herein, the formation of surface defects during the vulcanization step tends to promote oxygen and/or ozone attack of the coated material.

The cements of the present invention are found to be particularly valuable for coating unvulcanized pneumatic tires in the area of the tire extending from the tread portion to the bottom of the bead portion of the tire. This area of the tire may include shoulder, rib and cover strip portions.

While certain representative embodiments and details have been shown for the purpose of illustrating the invention it will be apparent to those skilled in this art that various modifications may be made without departing from the spirit or scope of the invention.

What I claim is:

1. A process for effectively releasing a vulcanized polymer from a vulcanization mold and for effectively retarding the formation of surface defects in the polymer during the vulcanization step and thereby producing a vulcanizate with improved surface characteristics comprising (A) depositing a layer of vulcanizable coating composition comprising (a) a polymeric portion which comprises (1) 10 to 100 parts of at least one ethylene propylene terpolymer and (2) 0 to 90 parts of at least one polymeric material selected from the group consisting of natural rubber, synthetic polymers and copolymers of conjugated dienes and synthetic polymers and copolymers of monoolefins and (b) a vulcanization system and (c) 100 to 1000 parts of carbon black, the parts of (1), (2) and (c) being by weight per 100 parts of said polymeric portion, on the surface of the unvulcanized polymer; (B) vulcanizing the coated polymer and the coating composition in a mold; and (C) removing the coated vulcanized polymer from the mold.

2. The process according to claim 1 wherein the depositing of the layer of the vulcanizable coating composition on the surface of the unvulcanized polymer comprises (a) placing a cement comprising the coating composition in combination with an inert organic solvent on the surface of the unvulcanized polymer, and (b) removing the inert organic solvent to provide a substantially solvent free layer of unvulcanized polymeric composition.

3. A process for releasing a vulcanized pneumatic tire from a vulcanization mold and for retarding the formation of surface defects during the vulcanization step in the area of the tire extending from the tread portion of the tire to the bottom of the bead portion of the tire to produce a tire with improved surface characteristics in said area comprising (a) coating said area with a cement comprising an inert organic solvent and a vulcanizable coating composition comprising (A) a polymeric portion which includes (1) 10 to 100 parts of at least one ethylene propylene terpolymer and (2) 0 to 90 parts of at least one polymeric material selected from the group consisting of natural rubber, synthetic polymers and copolymers of conjugated dienes and synthetic polymers and copolymers of monoolefins, and (B) a sulfur-type vulcanization system and (C) 100 to 1000 parts of carbon black, the parts of (1), (2) and (C) being by weight per 100 parts of said polymeric portion (b) vulcanizing the coated pneumatic tire in a mold; and (c) removing the coated vulcanized pneumatic tire from the mold.

4. A process according to claim 1 wherein the polymeric material is selected from the group consisting of natural rubber; polychloroprene; homopolymers of a conjugated 1,3-diene; copolymers of a conjugated 1,3-diene with up to 50 percent of at least one copolymerizable monomer; butyl rubber; polyethylene; polypropylene and ethylene propylene copolymer.

5. A process according to claim 3 wherein the polymeric material is selected from the group consisting of natural rubber; polychloroprene; homopolymer of a conjugated 1,3-diene; copolymer of a conjugated 1,3-diene with up to 50 percent by weight of at least one copolymerizable monomer; butyl rubber; polyethylene; polypropylene and ethylene propylene copolymers.

6. A process according to claim 1 wherein the polymeric material is selected from the group consisting of (a) polychloroprene, (b) polybutadiene, (c) polyisoprene, (d) copolymers of butadiene and styrene containing up to 50 percent by weight of bound styrene, (e) copolymers of butadiene and acrylonitrile containing up to 50 percent by weight of bound acrylonitrile, (f) copolymers of isoprene and styrene containing up to 50 percent by weight of bound styrene, (g) copolymers of isoprene and acrylonitrile containing up to 50 percent by weight of bound acrylonitrile, (h) butyl rubber, (i) polyethylene, (j) polypropylene, (k) ethylene propylene copolymers and (l) natural rubber.

7. The process according to claim 6 wherein the polymeric material is selected from the group consisting of (a) polybutadiene, (b) polyisoprene, (c) copolymers of butadiene and styrene containing up to 50 percent by weight of bound styrene and (d) natural rubber.

8. The process according to claim 7 wherein the coating composition includes 200 to 350 parts by weight per 100 parts by weight of said polymeric portion of carbon black, and a sulfur-type vulcanization system and wherein the ethylene propylene terpolymer is present in the amount of from 30 to 50 parts and the polymeric material is present in the amount of 70 to 50 parts per 100 parts by weight of said polymeric portion.

9. The process according to claim 8 wherein the polymeric material is a copolymer of butadiene and styrene containing up to 50 percent by weight of bound styrene.

10. The process according to claim 3 wherein the ethylene propylene terpolymer is present in the amount of from 30 to 50 parts and the polymeric material is present in the amount of from 70 to 50 parts, wherein the polymeric material is a copolymer of butadiene and styrene containing up to 50 percent by weight of bound styrene, wherein the carbon black is present in the amount of from 200 to 350 parts and wherein the vulcanization system is a sulfur type vulcanization system, all parts being by weight per 100 parts of said polymeric portion.

References Cited

UNITED STATES PATENTS

| | | | |
|---|---|---|---|
| 3,331,793 | 7/1967 | Souffie | 260—894 |
| 3,344,105 | 9/1967 | McDonel et al. | 260—41.5 |
| 3,364,155 | 1/1968 | Souffie | 260—33.6A |
| 3,106,443 | 10/1963 | Cuthberston et al. | 264—134 |
| 3,179,718 | 4/1965 | Wei et al. | 260—889 |
| 3,224,985 | 12/1965 | Gladding et al. | 260—889 |
| 3,343,582 | 9/1967 | Himes et al. | 260—889 |

OTHER REFERENCES

ECD-330, Development Products Report No. 18, December 1961, a Du Pont Publication.

Nordel, Du Pont Publication, 1964.

MORRIS LIEBMAN, Primary Examiner

S. L. FOX, Assistant Examiner

U.S. Cl. X.R.

264—134; 117—138.8; 152—330, 353, 374